Dec. 28, 1943.  A. L. VAN NEST  2,337,696
ARTICLE WORKING APPARATUS
Filed June 12, 1940  3 Sheets-Sheet 1
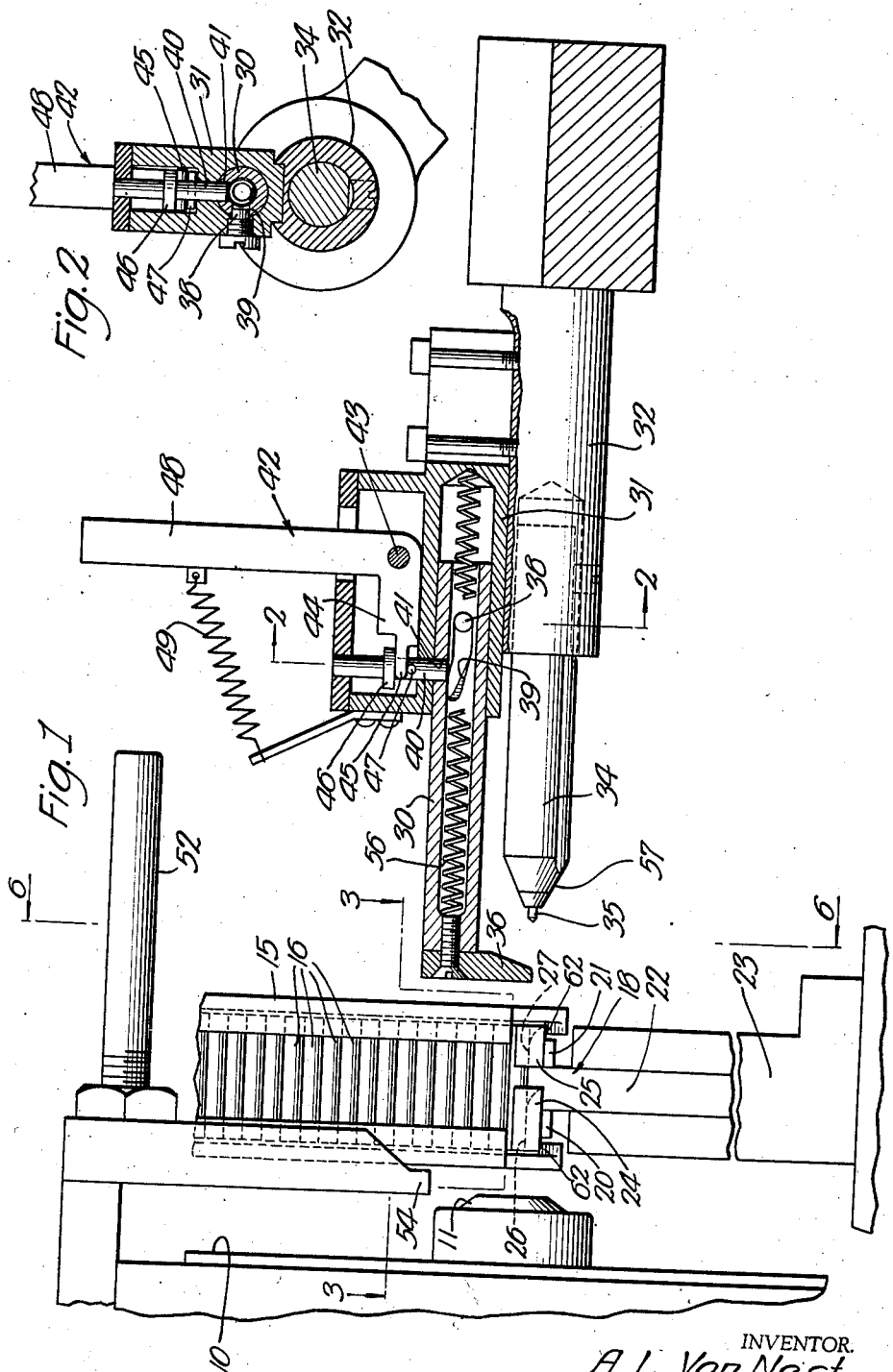
INVENTOR.
A. L. Van Nest
BY Emery Robinson
ATTORNEY.

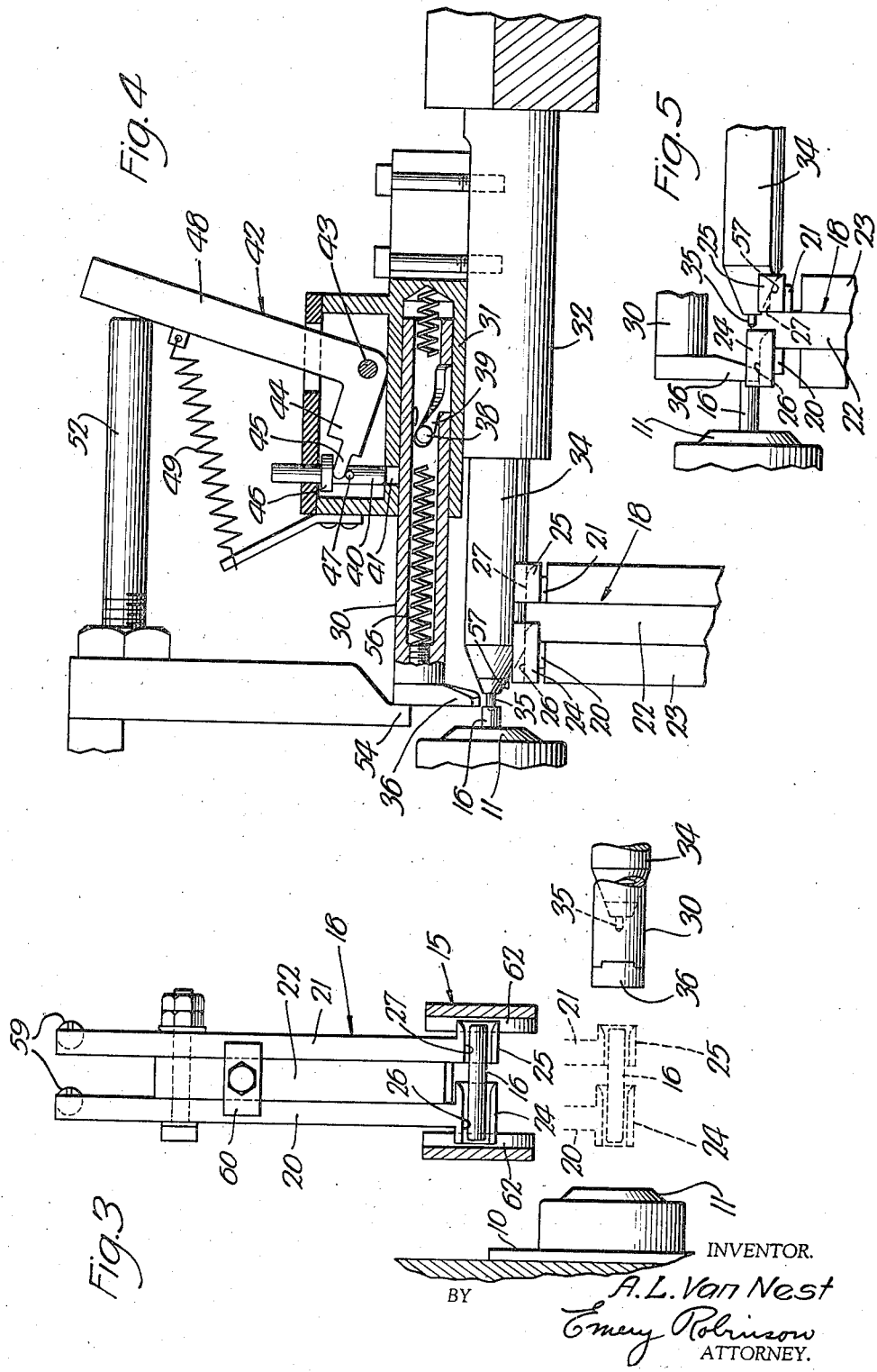

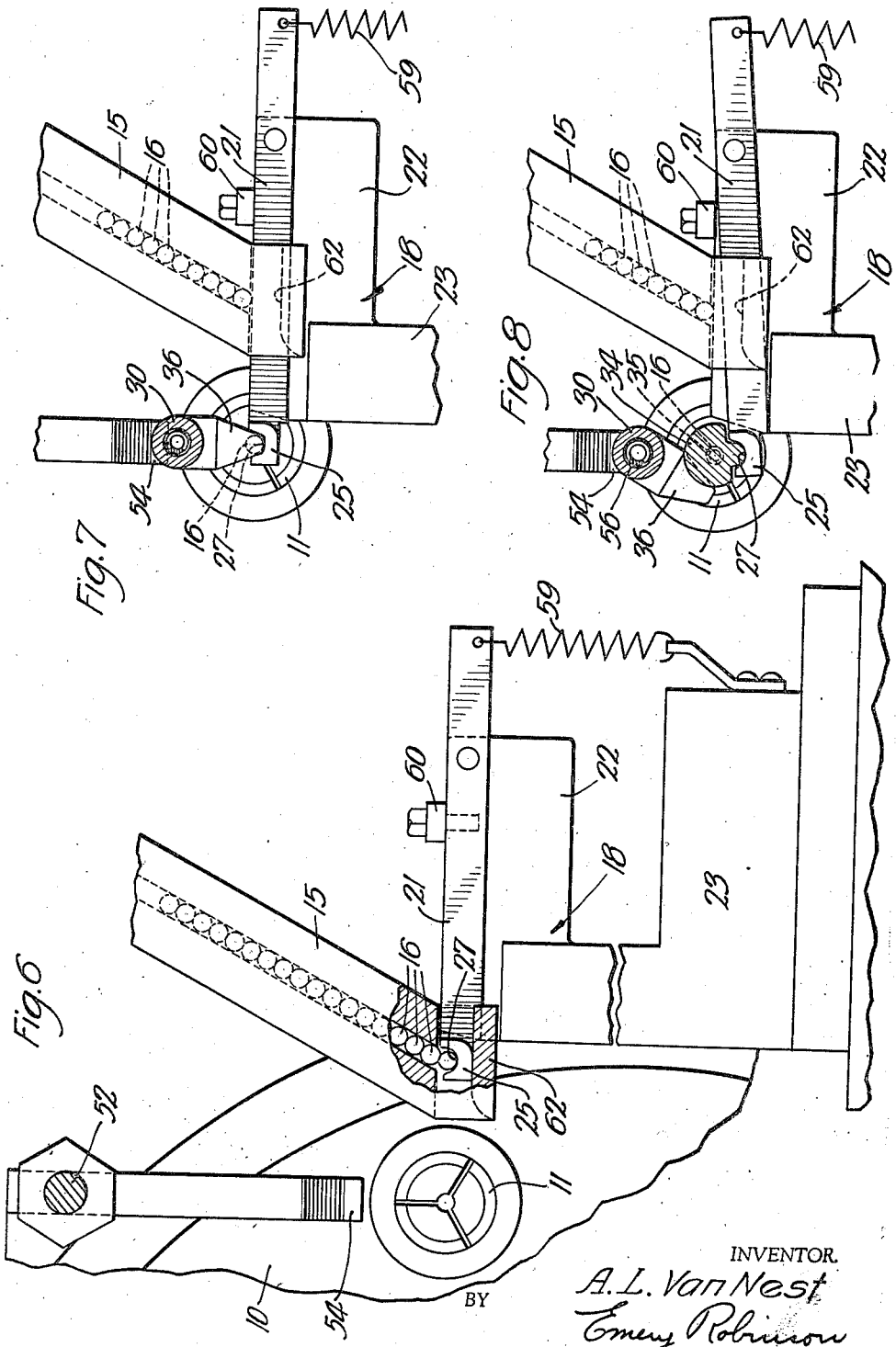

Patented Dec. 28, 1943

2,337,696

UNITED STATES PATENT OFFICE 2,337,696

ARTICLE WORKING APPARATUS

Arden L. Van Nest, Oak Park, Ill., assignor to Western Electric Company, Incorporated, New York, N. Y., a corporation of New York Application June 12, 1940, Serial No. 340,045

6 Claims. (Cl. 29—60)

This invention relates to article working apparatus, and more particularly to a work feeding and centering attachment for multiple spindle automatic screw machines and the like.

Objects of the invention are to provide a simple, inexpensive and efficient work feeding and centering apparatus for screw machines and the like.

One embodiment of the invention contemplates the provision of a blank feeding and centering attachment for multiple spindle automatic screw machines of the type in which a plurality of work holding spindles or chucks are indexed to successive stations. The attachment comprises means for automatically inserting work blanks into the chucks while they dwell at a work feeding station, and means for centering the blanks for subsequent drilling operations. In accordance with a novel feature of the invention, the blanks are centered at the same station at which they are inserted into the chucks, thus rendering the remaining stations available for drilling or other operations.

A preferred embodiment of the invention is illustrated in the accompanying drawings, in which Fig. 1 is a front elevational view, partly in section, of a blank feeding and centering attachment embodying the invention, illustrated in conjunction with a multiple spindle screw machine, only a portion of which is shown;

Fig. 2 is a detail sectional view taken on line 2—2 of Fig. 1;

Fig. 3 is a detail sectional view taken on line 3—3 of Fig. 1;

Fig. 4 is a view similar to Fig. 1, but with the magazine removed in order to illustrate more clearly the positions assumed by the blank inserter and the centering tool during the centering operation;

Fig. 5 is a fragmentary elevational view showing the blank inserter and the centering tool in partially advanced positions;

Fig. 6 is a fragmentary vertical section taken on line 6—6 of Fig. 1, and

Figs. 7 and 8 are fragmentary sections similar to Fig. 6, showing the moving parts in different positions.

The apparatus is illustrated in the drawings as applied to a multiple spindle automatic screw machine comprising a rotary carrier or turret 10 (Figs. 1 and 6) in which a circular series of work holding spindles are rotatably mounted, each spindle terminating in a work holding chuck 11, only one of which is shown, since all are identical.

By suitable driving means (none shown), the work holding spindles are rotated about their respective axes and the turret is intermittently rotated to index the several spindles to successive stations. Adjacent one of the stations, the one illustrated in Fig. 6 and hereinafter referred to as the work feeding and centering station, there is provided a work holding magazine 15 which is attached to a stationary portion (not shown) of the machine frame. The magazine in the illustrated embodiment of the invention is adapted to hold a stack of cylindrical blanks 16, 16 from which wire connecting sleeves are produced by a series of drilling operations performed at the several stations following the work feeding and centering station.

A transfer mechanism 18 is provided for transferring the blanks, one at a time, from the bottom of the magazine to a position in front of and in axial alignment with the work holding chucks upon their arrival at the work feeding and centering station. This transfer mechanism comprises a pair of blank carriers 20 and 21 pivotally mounted on opposite sides of a reciprocatory plate 22 attached to a cross slide 23 of the machine. The blank carriers 20 and 21 have transverse end portions 24 and 25, respectively, formed with blank receiving and retaining grooves 26 and 27, respectively. By the reciprocation of the cross slide 23, the transfer mechanism is moved back and forth beneath the magazine 15. In the retracted position of the transfer mechanism, the blank receiving grooves 26 and 27 of the blank carriers are in position to receive a blank from the bottom of the magazine, as shown in Fig. 6. Upon movement of the transfer mechanism to the position shown in Fig. 7, the blank is carried to a position in front of and in axial alignment with the chuck 11. The remaining blanks are held in the magazine by the upper edge of plate 22 sliding across the discharge opening of the magazine.

Having been carried to a position in front of the chuck, the blank is then pushed into the chuck by a reciprocatory pusher bar 30 mounted in a block 31 attached to a tool slide 32 of the screw machine. A centering drill holder 34 is also attached to the tool slide 32 and is equipped with a centering drill 35 which is in axial alignment with the chuck 11 at the work feeding and centering station. A blank engaging finger 36 is attached to the forward end of the pusher bar and normally hangs in front of the centering drill so as to engage the end of the blank and push it into the chuck upon movement of the tool slide toward the chuck.

As shown in Figs. 1 and 4, the pusher bar 30 is of tubular construction and is slidable and rotatable in the supporting block 31. A pin 38 is fixed to the block and extends into a cam slot 39 in the pusher bar. This pin and cam slot connection imparts a rotary motion to the pusher bar when it is moved endwise in the supporting block. The pusher bar is, however, normally locked against movement in the supporting block by a vertical locking pin 40 which is slidable in the block and normally extends into an aperture 41 in the pusher bar. An angle lever 42 is pivoted at 43 to the supporting block, and a horizontal arm 44 of the angle lever terminates in a bifurcated end portion 45 which straddles the locking pin 40 between a shoulder 46 and a pin 47. A vertical arm 48 of the angle lever extends upwardly from the supporting block and has a spring 49 attached thereto, whereby the angle lever is urged in a counterclockwise direction (Fig. 1) so as to yieldably hold locking pin 40 in its locking position. As the pusher bar approaches the end of its movement toward the chuck 11, the vertical arm of the angle lever engages a fixed stop 52, whereby the angle lever is rocked in a clockwise direction to the position in which it is shown in Fig. 4, thus retracting the locking pin from the pusher bar. A fixed stop 54 is disposed in the path of the pusher bar so as to interrupt its movement toward the chuck as soon as the blank has been properly inserted into the chuck. The stop 52 is positioned so that the locking pin is retracted from the pusher bar just before the latter engages the stop 54.

After the pusher bar has come to rest against the fixed stop 54, the tool slide continues to move toward the chuck to operatively engage the centering drill with the end of the blank to center it for the subsequent drilling operations. This final movement of the tool slide also compresses a spring 56 housed within the pusher bar and, through the cooperation of pin 38 and cam slot 39, imparts a rotary motion to the pusher bar so as to swing the pusher bar finger 36 out of the path of the centering drill as the latter approaches the blank previously inserted in the chuck. As the centering drill approaches the blank, the blank carrying end portions of the blank carriers 20 and 21 are depressed by the centering drill holder 34. A conical surface 57 of the centering drill holder engages and depresses first the blank carrying member 21, as shown in Fig. 5, and then the blank carrying member 20, as shown in Fig. 4. During the return movement of the tool slide, spring 56 returns the pusher bar to its original position with respect to the centering drill, and spring 49 actuates angle lever 42 to re-engage locking pin 40 with the pusher bar. After withdrawal of the centering drill, the blank carrying members are restored by suitable springs 59, 59 to their horizontal positions against a stop plate 60 attached to carrier plate 22. The transfer mechanism then returns to receive another blank from the magazine, thus completing one cycle of operation of the apparatus. During the return movement of the transfer mechanism, the blank carrying end portions 24 and 25 of pivoted members 20 and 21, respectively, slide onto shelf-like supporting rails 62, 62 formed on or attached to the bottom of the magazine. These supporting rails prevent sagging of the blank carrying members under the weight of the stack of blanks in the magazine.

The operation of the apparatus, it is believed, will be clearly understood from the foregoing description. It will be noted that the centering operation is performed at the work feeding station of the machine, thus rendering the remaining stations available for drilling or other operations. This is particularly advantageous when a separate station cannot be spared for the centering operation.

It will be obvious that the invention is not limited to the specific embodiments thereof herein illustrated and described, except insofar as is defined by the appended claims.

What is claimed is:

1. In an article working apparatus, a work holding chuck, a reciprocatory slide mounted for movement axially of said chuck, a tool attached to said slide, means carried by said slide for feeding a work blank into said chuck, said feeding means comprising a bar mounted for rotary and endwise movement in said slide, a blank engaging finger attached to said bar and normally extending across the path of said tool, and means for moving said finger out of said path upon insertion of a work blank into said chuck.

2. In an article working apparatus, a work holding chuck, a reciprocatory slide mounted for movement axially of said chuck, a tool attached to said slide, means carried by said slide for feeding a work blank into said chuck, said feeding means comprising a blank engaging finger normally extending across the path of said tool, and means for moving said finger out of said path after the insertion of a work blank into the chuck and before engaging the tool with said work blank.

3. In an article working apparatus, a work holding chuck, a reciprocatory slide mounted for movement axially of said chuck, a tool attached to said slide, means carried by said slide for feeding a work blank into said chuck, said feeding means comprising a bar mounted for rotary and endwise movement in said slide, a blank engaging finger attached to said bar and normally extending across the path of said tool, and a pin and cam slot connection between said bar and said slide for swinging said finger out of said path upon relative endwise movement between said bar and said slide.

4. In an article working apparatus, a work holding chuck, a slide mounted for movement longitudinally of said chuck, and means carried by said slide for feeding a work blank into said chuck, said feeding means comprising a rotary member having an eccentric blank engaging and feeding element normally positioned in axial alignment with said chuck, and means for rotating said member to move said blank feeding element out of said position.

5. In an article working apparatus having a series of work holding chucks adapted to be indexed to successive stations including a feeding station, means for inserting a work blank into each of said chucks upon arrival thereof at said feeding station, said means comprising a reciprocatory slide mounted for movement longitudinally of said chucks, a blank engaging and feeding member mounted for movement on said slide and normally positioned in axial alignment with the chuck at the feeding station, means responsive to a movement of the blank feeding member on said slide for shifting said feeding member out of said position, and forming means on said slide for operating on a work blank at the feeding station after said work blank has been inserted into said chuck.

6. In an article working apparatus, a work holding chuck, a slide mounted for movement longitudinally of said chuck, and means carried by said slide for inserting a work blank into said chuck, said means comprising a bar mounted for rotary and endwise movement in said slide, a blank engaging finger attached to said bar and normally positioned in axial alignment with said chuck, and a pin and cam slot connection between the bar and the slide for rotating said bar to swing said finger out of said aligned position upon relative endwise movement between said bar and said slide.

ARDEN L. VAN NEST.